(12) United States Patent
Ju et al.

(10) Patent No.: US 12,447,612 B2
(45) Date of Patent: Oct. 21, 2025

(54) ADMITTANCE CONTROL METHOD, ROBOT, AND COMPUTER-READABLE STORAGE MEDIUM

(71) Applicant: UBTECH ROBOTICS CORP LTD, Shenzhen (CN)

(72) Inventors: Xiaozhu Ju, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 167 days.

(21) Appl. No.: 18/518,955

(22) Filed: Nov. 25, 2023

(65) Prior Publication Data

US 2024/0091934 A1 Mar. 21, 2024

Related U.S. Application Data

(63) Continuation of application No. PCT/CN2021/131675, filed on Nov. 19, 2021.

(30) Foreign Application Priority Data

May 26, 2021 (CN) .......................... 202110578796.9

(51) Int. Cl.
  *B25J 19/06* (2006.01)
  *B25J 9/16* (2006.01)
  *B25J 13/08* (2006.01)

(52) U.S. Cl.
  CPC .......... *B25J 9/1633* (2013.01); *B25J 9/1607* (2013.01); *B25J 9/163* (2013.01); *B25J 9/1664* (2013.01); *B25J 13/085* (2013.01); *B25J 13/089* (2013.01)

(58) Field of Classification Search
  CPC ........ B25J 13/089; B25J 13/085; B25J 9/163; B25J 9/1664; B25J 9/1676; B25J 9/1607;
  (Continued)

(56) References Cited

U.S. PATENT DOCUMENTS 7,949,430 B2 * 5/2011 Pratt .................... B62D 57/032
  180/8.5
8,849,454 B2 * 9/2014 Yun ...................... B62D 57/032
  901/1

(Continued)

FOREIGN PATENT DOCUMENTS

CN   111730605 A   10/2020
CN   112558486 A   3/2021

OTHER PUBLICATIONS

ISR for PCT/CN2021/131675.
Written opinions of ISA for PCT/CN2021/131675.

*Primary Examiner* — Dalena Tran

(57) ABSTRACT

An admittance control method, a robot, and a storage medium are provided. The method includes: obtaining, based on a first admittance controller transfer function between force and position, a desired position of a robot in a current control cycle; determining a corresponding Jacobian matrix according to a configuration of the robot in the current control cycle, and calculating an ill condition number of the Jacobian matrix; and controlling the robot to move by inputting the obtained desired position in the current control cycle to a corresponding joint, in response to the ill condition number being less than a preset maximum ill condition number. In this manner, the configuration of the robot can be maintained within a reasonable rang of the ill condition number, and singularities caused by the admittance controller exceeding the work space can be avoided while the velocity reachability and force reachability of the robot can be ensured.

20 Claims, 13 Drawing Sheets

(58) Field of Classification Search
CPC ............... B25J 9/1633; G05D 1/00; G05B 2219/40201; G05B 2219/39339; G05B 2219/39062; G05B 2219/40586
See application file for complete search history.

(56) References Cited

U.S. PATENT DOCUMENTS

| | | | |
|---|---|---|---|
| 9,586,316 B1 * | 3/2017 | Swilling | B25J 9/1664 |
| 11,654,569 B2 * | 5/2023 | Blankespoor | B25J 9/1628 |
| | | | 700/254 |
| 11,780,085 B2 | 10/2023 | Ju et al. | |
| 2007/0016329 A1 * | 1/2007 | Herr | A61F 2/70 |
| | | | 700/250 |

* cited by examiner

ADMITTANCE CONTROL METHOD, ROBOT, AND COMPUTER-READABLE STORAGE MEDIUM

CROSS REFERENCE TO RELATED APPLICATIONS

The present disclosure is a continuation-application of International Application PCT/CN2021/131675, with an international filing date of Nov. 19, 2021, which claims foreign priority of Chinese Patent Application No. 2021105787969 filed on May 26, 2021 in the State Intellectual Property Office of China, the contents of all of which are hereby incorporated by reference.

BACKGROUND

1. Technical Field

The present disclosure relates to robot control technology, and particularly to an admittance control method and system, a robot, and a computer-readable storage medium.

2. Description of Related Art

Some robots such as humanoid robots are often used in service scenarios in close contact with people, hence compliance is an important indicator of the safety of such robots. In order to achieve the compliance of the joint space and the work space of a robot, an admittance controller can be used.

To design the admittance controller, the mathematical model of a mass-spring-damping system can be used. Generally, the admittance controller may be designed by adjusting various parameters of the mass-spring-damping system, thereby achieving the desired dynamics characteristics and dynamic response effects. However, in practical applications, the admittance controller obtained by performing the above-mentioned parameter adjustments on the mathematical model of the mass-spring-damper system will have some technical problems, for example, ignoring a variety of the robot's own limitations to cause its abnormality, or failing to meet requirements such as constraints and restrictions on the movement of the robot.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
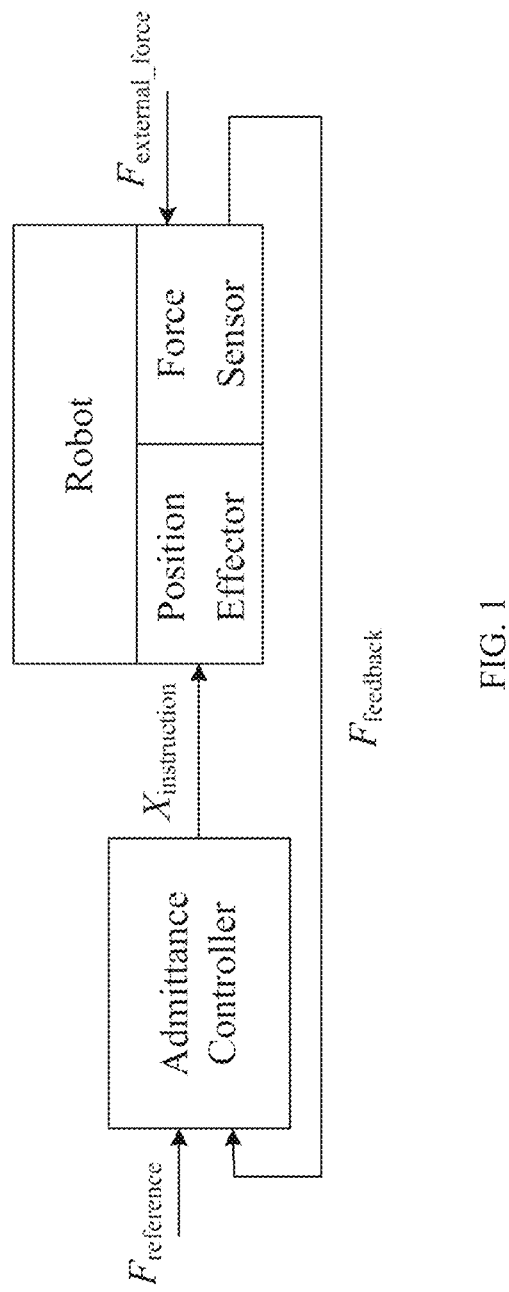
FIG. 1 is a schematic diagram of an application of a general admittance controller according to an embodiment of the present disclosure.

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure.

The components of the embodiments of the present disclosure that are described and illustrated in the drawings herein may generally be arranged and designed in a variety of different configurations. Therefore, the following detailed description of the embodiments of the present disclosure provided in the drawings is not intended to limit the scope of the present disclosure, but merely represent the selected embodiments of the present disclosure. Based on the embodiments in the present disclosure, all other embodiments obtained by those of ordinary skill in the art without creative work fall within the protection scope of the present disclosure.

Admittance controllers are widely used in robot technology. FIG. 1 is a schematic diagram of an application of a general admittance controller according to an embodiment of the present disclosure. As shown in FIG. 1, the working principle of the existing general admittance controller can be understood that the contact force between the robot and the outside world that is obtained through the measurement of a force sensor or external force estimation as well as the upper-level planned reference force are used as the input of the admittance controller, and the input force instruction is converted into the position instruction of the robot through the admittance controller so as to transmit to the corresponding joint position effector.

For the general admittance controllers designed by adjusting various parameters of the mass-spring-damping system, there are some limitations in practical applications because only a simple relationship between force and position is established. As an example, various limitations that lead to abnormal operation of the robot are ignored. Specifically, a robot often has some singular positions by its natural, which makes a certain range outside the work space inaccessible.

Therefore, when approaching the singular positions of the robot, abnormalities are prone to occur. As another example, the effector of the robot has hardware structural limitations such as torque and velocity, and may not be able to achieve the desired velocity, acceleration, or the like. If the instructions exceeding these hardware structural limitations are transmitted to the effector, the self-protection logic of the effector will often triggered, which causes the failure in the execution of the robot. In addition, in scenes of interacting with people, certain constraints and restrictions on the movement of the robot also need to be imposed so as to prevent the excessive acceleration and velocity of the movement of the robot which will cause physical damages to the objects it interacts with, which the general admittance controller cannot satisfy, either.

To this end, in this embodiment, a robot admittance control method is provided. By constraining position instructions output by an admittance controller based on an ill condition number, it avoids singularities caused by the admittance controller exceeding the work space to maintain the configuration of the robot within a reasonable rang of the ill condition number while the velocity operability and force operability of the robot can be ensured, and limits the acceleration, velocity and position trajectories generated by the admittance controller to a reasonable range. Descriptions will be made below by combining the specific embodiment.

Embodiment 1

Figure 2:
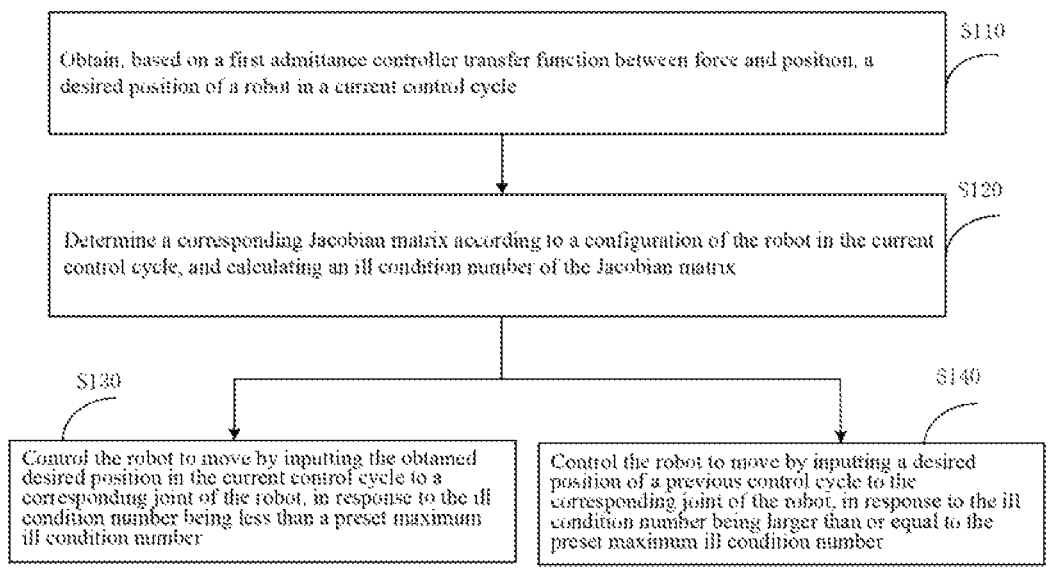
FIG. 2 is a flow chart of a robot admittance control method according to embodiment 1 of the present disclosure.

FIG. 2 is a flow chart of a robot admittance control method according to embodiment 1 of the present disclosure. As shown in FIG. 2, a computer-implemented admittance control method for the robot is provided, which may be applied to the occasion of a humanoid robot that requires the robot or a mechanical arm to perform compliant control, for example, guiding by dragging, balance control, and landing buffer and indirect force control of a legged robot. The method may be implemented through a robot admittance control system shown in FIG. 10. The admittance control method may include the following steps.

S110: obtaining, based on a first admittance controller transfer function between force and position, a desired position of the robot in a current control cycle.

Admittance control is usually considered to establish a type of mathematical model that converts from force instructions into position instructions. For example, the common models may include the mass-spring-damping model, or may be other similar or derived models. In this embodiment, an admittance controller of the robot will be constructed based on the mass-spring-damping model, where position instructions with constrains are obtained by constraining the desired positions output by the admittance controller based on the ill condition number.

In this embodiment, if the admittance controller of the robot is constructed based on the mass-spring-damping model, the admittance controller transfer function between the force input and the position output at this time may be expressed as:

$$\frac{X(s)}{F(s)} = \frac{1}{Ms^2 + Cs + K};$$

where, F represents a force which is used as the input of the admittance controller of the robot; X represents the position which is used as the output of the admittance controller; M is an inertial admittance operator which will determine the gain of the admittance controller; C is a resistive admittance operator which will determine the damping term of the admittance controller; and K is the capacitive admittance operator which will determine the response frequency of the admittance controller; and s represents the complex frequency domain which can also be called a continuous domain since the signal in s domain is continuous.

Considering that the above-mentioned transfer function is a continuous time system, and the control of the robot is based on a digital system, that is, instructional control is performed based on each control cycle, the above-mentioned admittance controller transfer function needs to be converted from the continuous domain (i.e., s domain) to the discrete domain (i.e., z domain), that is, discretization processing if performed. For example, the method of discretization processing may include but is not limited to the bilinear transformation method, the first-order forward difference method, or the first-order backward difference method, or the like.

It can be understood that the above-mentioned first admittance controller transfer function reflects the relationship between the input force and the output position. Therefore, when the input force of the corresponding control cycle is obtained, the desired position of the robot in the corresponding control cycle may be directly calculated. Optionally, if it is necessary to constrain the velocity and/or acceleration, the desired position of the robot may also be indirectly calculated by sequentially performing acceleration integration and velocity integration.

In which, the above-mentioned input force may include a reference force that is planned by the upper layer and a contact force between the robot and the outside world that is obtained by feedback. The feedback of the contact force between the robot and the outside world may be realized by, for example, disposing a six-dimensional force sensor at the end of the limbs of the position control type robots so as to directly measure the contact force with the outside world, or disposing a torque sensor at the joint of the force control type robots so as to sense the contact force between the robot and the outside world through estimating external forces.

In this embodiment, in order to ensure that the robot has good velocity reachability and force reachability, that is, velocity operability and force operability, and to prevent the robot from reaching or approaching singular positions, it will use the ill condition numbers to determine and constrain the position instruction output by the admittance control, which can avoid the unreachable position instruction of the robot due to excessive external force, the singular configuration of the robot, or the like. In which, the configuration of the robot also refers to the joint angle of each joint of the robot. When the configuration of the robot is determined, the Jacobian matrix corresponding to the current configuration is also determined.

An ill-conditioned matrix is defined as its condition number being too large. When the condition number reaches infinity, the matrix is a singular matrix, which also represents the singular configuration of the robot. Therefore, the condition number of a matrix is defined as the ratio of the largest singular value to the smallest singular value in the matrix, which is denoted as an equation of:

$$N = \frac{\sigma_{max}}{\sigma_{min}};$$

where, $\sigma_{max}$ represents the maximum value of singular values in singular value decomposition, and $\sigma_{min}$ represents the minimum value of singular values in singular value decomposition. Since the normal matrix is close to a circle in the feature space, while the ill-conditioned matrix is narrow and elliptical in the feature space, the minimum value of the condition number of the matrix will be 1. It can be understood that if the ill condition number of the current Jacobian matrix of the robot is closer to 1, it indicates that the task is better executed; otherwise, the more the ill condition number of the Jacobian matrix is closer to infinity, the more difficult the task is to execute.

In this embodiment, the force reachability and velocity reachability of the robot in the current state will be determined based on the ill condition number of the Jacobian matrix of the robot. It can be understood that the execution order of steps S110 and S120 is not limited. They may be executed at the same time or in a specified sequence.

S120: determining a corresponding Jacobian matrix according to a configuration of the robot in the current control cycle, and calculating an ill condition number of the Jacobian matrix.

In this embodiment, after the configuration of the robot in the current control cycle is determined, the current Jacobian matrix may be calculated, and then the ill condition number of the current Jacobian matrix may be solved.

In one embodiment, the maximum singular value among the singular values of the Jacobian matrix is the second norm of the Jacobian matrix, and the minimum singular value is the second norm of the inverse matrix of the Jacobian matrix. Therefore, the ill condition number of the Jacobian matrix may be calculated as an equation of:

$$cond(J) = \frac{\|J\|_2}{\|J^{-1}\|_2};$$

where, cond is the ill condition number; J is the Jacobian matrix of the current control cycle; is the second norm of the Jacobian matrix J; and $\|J\|_2$ is the second norm of the inverse matrix $J^{-1}$ of the Jacobian matrix $\|J^{-1}\|_2$.

After calculating the ill condition number under the current configuration, the ill condition number may be used as the limit threshold output by the position instruction of the admittance control. For example, if the ill condition number is less than a preset maximum value of the ill condition number, step S130 is executed. Furthermore, optionally, if the ill condition number is larger than or equal to the maximum value of the ill condition number, step S140 is executed.

S130: controlling the robot to move by inputting the obtained desired position in the current control cycle to a corresponding joint of the robot, in response to the ill condition number being less than a preset maximum ill condition number.

S140: controlling the robot to move by inputting a desired position of a previous control cycle to the corresponding joint of the robot, in response to the ill condition number being larger than or equal to the preset maximum ill condition number.

In this embodiment, judging by the ill condition number in the current state, there is:

$$X_{cmd}^{(n)} = \begin{cases} X_{des}^{(n)} & \mathbb{N} < \mathbb{N}_{max} \\ X_{des}^{(n-1)} & \mathbb{N} \geq \mathbb{N}_{max} \end{cases};$$

where, $\mathbb{N}_{max}$ represents the maximum value of the ill condition number, which is related to the robot's own structure and can usually be set in advance. n represents the n-th control cycle; $X_{cmd}$ represents the eventual outputted position instruction; and $X_{des}$ represents the desired position. Therefore, it can be understood that $X_{des}^{(n)}$ refers to the desired position of the n-th control cycle, and $X_{des}^{(n-1)}$ refers to the desired position of the (n−1)-th control cycle.

It can be seen that if the maximum value of the ill condition number is not reached, it means that the robot has not reached or approached the singular position. The velocity and force at this time are executable, so there is no need to limit the currently calculated position output. Otherwise, if the desired position calculated under the current configuration reaches the maximum value of the ill condition number, it means that the configuration will reach or approach the singular position. At this time, the desired position of the previous control cycle may be used as the position instruction of the current control cycle for performing joint control, thereby keeping the robot in its current state and avoiding singular states.

In this embodiment, the ill condition number of the Jacobian matrix of the robot is used as the basis for judging the limit threshold of outputting the position instruction by the admittance controller, and the position instruction of the robot in the work space is limited when necessary. By realizing such a constraint method, the movement and positional changes of the robot in the work space that are caused by admittance control do not need to manually specify its movement range. Instead, it starts from the current configuration of the robot, the constraint range of its position can be automatically determined according to its velocity reachability and whether it is close to the singular state. The configuration of the robot can be maintained within a reasonable range of the ill condition number, thereby obtaining better force reachability and velocity reachability of the robot in the work space, and also avoiding the robot from singularity which is caused by the admittance controller exceeding the scope of the working space.

Embodiment 2

Figure 3:
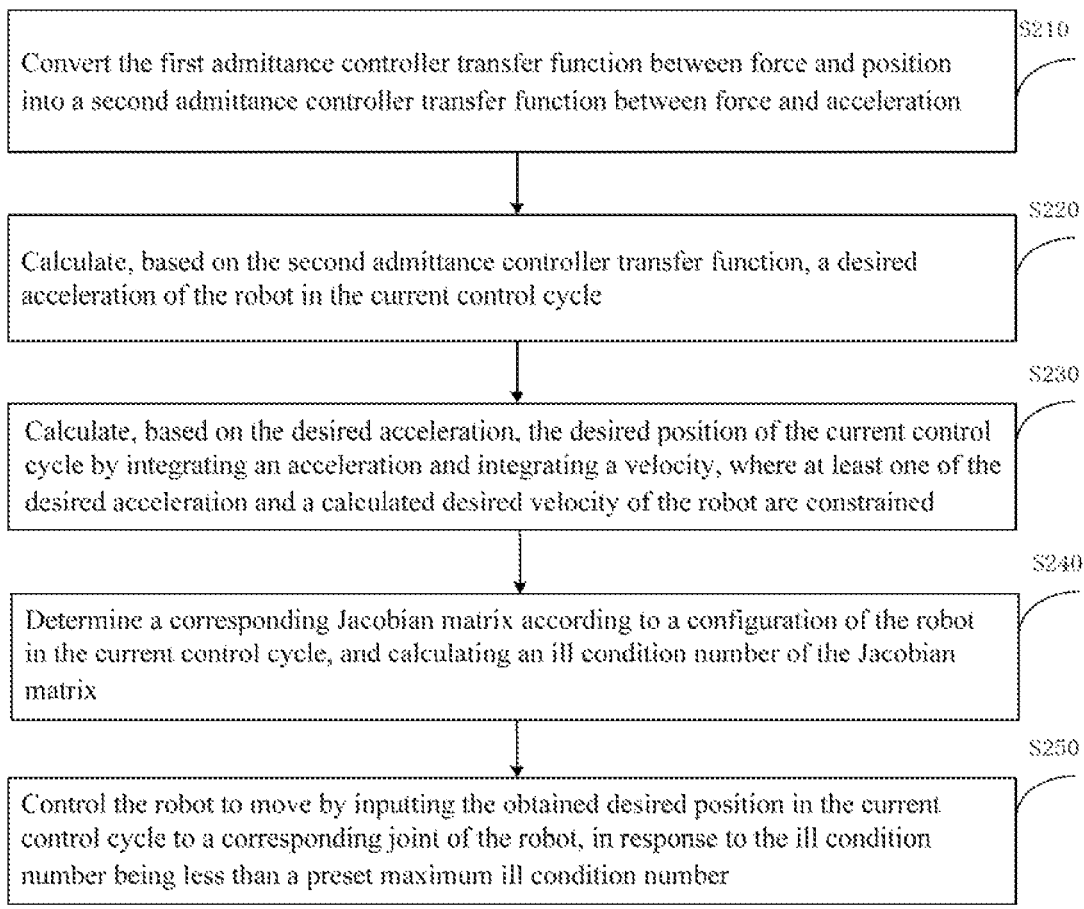
FIG. 3 is a flow chart of a robot admittance control method according to embodiment 2 of the present disclosure.

FIG. 3 is a flow chart of a robot admittance control method according to an embodiment 2 of the present disclosure. As shown in FIG. 3, in this embodiment, based on the method of the above-mentioned Embodiment 1, another robot admittance control method is provided.

For the general admittance controller, in addition to the possibility that a certain range outside the work space is inaccessible or an abnormality is prone to occur when approaching a singular position of the robot, considering that the effector of the robot often has maximum limits on torque, velocity, and the like, if the instruction exceeding these limitations are transmitted to the effector, the self-protection logic of the effector will often triggered, which causes the failure in the execution of the robot. As another example, in some scenarios of interaction with users, the movement of the robot often needs to be subject to certain constraints and restrictions to ensure that the user or the robot will not be damaged. To this end, in this embodiment, it will introduce the constraints on the acceleration term and/or velocity term into the admittance control, the desired position of the output of the admittance control is calculated using the constrained acceleration and/or velocity, and then the position term is constrained based on the ill condition number, thereby realizing the admittance control operation with a plurality of constraints.

In this embodiment, based on the admittance controller transfer function between force and position, the transfer function at the acceleration level is further constructed by converting the transfer function, so as to add corresponding constraint on the acceleration and/or the subsequent calculated velocity, thereby implementing taking the robot's own limitations such as joint torque and joint velocity into account during performing the admittance control.

In this embodiment, as shown in FIG. 3, the admittance control method of the robot may include the following steps.

S210: converting the first admittance controller transfer function between force and position into a second admittance controller transfer function between force and acceleration.

In this embodiment, for the admittance controller transfer function between force and position, the admittance controller transfer function at the acceleration level may be constructed through two differential processes. It can be understood that the "first" in the above-mentioned first admittance controller transfer function and the "second" in the above-mentioned second admittance controller transfer function are only used to distinguish different transfer functions.

For example, taking the admittance controller transfer function $$\frac{X(s)}{F(s)} = \frac{1}{Ms^2 + Cs + K}$$

in the above-mentioned embodiment 1 as an example, the constructed admittance controller transfer function between the force F and the acceleration $\ddot{X}$ may be expressed as an equation of:

$$\frac{\ddot{X}(s)}{F(s)} = \frac{s^2}{Ms^2 + Cs + K}.$$

Furthermore, the second admittance controller transfer function in the continuous domain is discretized to obtain the second admittance controller transfer function between force and acceleration in the discrete domain. In one embodiment, if the Tustin's method (also known as bilinear transform) is used for discretization processing, that is, assuming that $$s = \frac{2}{T_s} \frac{1 - z^{-1}}{1 + z^{-1}},$$

where $T_s$ is the control cycle, z represents the discrete complex frequency domain, then the admittance controller transfer function between force and acceleration in the z domain at this time may be expressed as an equation of:

$$\frac{\ddot{X}(s)}{F(s)} = \frac{1 - 2z^{-1} + z^{-2}}{(M + C + K) + 2(K - M)z^{-1} + (M - C + K)z^{-2}}.$$

It can be understood that the admittance controller transfer function between force and acceleration in the discrete domain will be different according to the relationship between s and z, and only the bilinear transform is taken as an example herein. As an example, for the first-order forward difference, there is $$s = \frac{z - 1}{T_s}.$$

As another example, for the first-order backward difference, there is $$s = \frac{1 - z^{-1}}{T_s}.$$

The specific discretization method may be selected according to actual needs, which is not limited herein.

S220: calculating, based on the second admittance controller transfer function, a desired acceleration of the robot in the current control cycle.

In this embodiment, the desired acceleration of the corresponding control cycle may be obtained based on the admittance controller transfer function between force and acceleration in the discrete domain. Still taking the admittance controller transfer function between force and acceleration in the z domain that is obtained by the Tustin's method as an example, the desired acceleration at this time may be expressed as an equation of:

$$\ddot{X}_{des}^{(n)} = F^{(n)} - 2F^{(n-1)} + F^{(n-2)} - \frac{2(K - M)}{M + C + K} \ddot{X}_{cmd}^{(n-1)} - \frac{M - C + K}{M + C + K} \ddot{X}_{cmd}^{(n-2)};$$

where, $\ddot{X}_{des}$ represents the desired acceleration. It can be seen that the desired acceleration $\ddot{X}_{des}$ is related to the acceleration instruction $\ddot{X}_{cmd}$ of the historical control cycle, the force F input to the admittance controller, and the like. For example, if the n-th control cycle is used as the current time base, $F^{(n)}$ represents the force input in the current control cycle, $F^{(n-1)}$ and $\ddot{X}_{cmd}^{(n-1)}$ represents the force and the acceleration instruction of the previous control cycle, respectively; and $F^{(n-2)}$ and $\ddot{X}_{cmd}^{(n-2)}$ represent the force and the acceleration instructions of the previous control cycle, respectively.

It should be understood that the subscripts des and cmd are mainly used to distinguish the desired acceleration and the eventually determined acceleration instruction. If the acceleration is constrained, the acceleration instruction $\ddot{X}_{cmd}$ may be obtained by constraining the desired acceleration $\ddot{X}_{des}$. Otherwise, if the acceleration is not constrained, the acceleration instruction $\ddot{X}_{cmd}$ will be equal to the desired acceleration $\ddot{X}_{des}$. Furthermore, if the discretization is performed in other manners, the equation for expressing the desired acceleration will be different, too.

S230: calculating, based on the desired acceleration, the desired position of the current control cycle by integrating an acceleration and integrating a velocity, where at least one of the desired acceleration and a calculated desired velocity of the robot are constrained, where the desired acceleration is constrained before the acceleration is integrated, and the calculated desired velocity is constrained before the velocity is integrated.

Regarding the relationship among the acceleration, the velocity and the position, the transformation from the acceleration to the velocity may be realized through integration, and the transformation from the velocity to the position may also be realized through integration. Taking the above-mentioned Tustin's method as an example, the integrator of the discrete system may be expressed as an equation of:

$$\frac{\dot{X}(z)}{\ddot{X}(z)} = \frac{T_s}{2} \frac{1+z^{-1}}{1-z^{-1}}.$$

In this embodiment, if the above-mentioned integrator is used for integrating the acceleration, the desired velocity generated in the corresponding control cycle may be obtained as an equation of:

$$\hat{\dot{X}}_{des}^{(n)} = \dot{X}_{cmd}^{(n-1)} + \frac{T_s}{2}\left(\ddot{X}_{cmd}^{(n)} + \ddot{X}_{cmd}^{(n-1)}\right);$$

where, $\dot{X}_{des}$ represents the desired velocity, and $\dot{X}_{cmd}$ represents the velocity instruction. It can be understood that if the velocity is constrained, the velocity instruction $\dot{X}_{cmd}$ may be obtained by constraining the desired velocity $\dot{X}_{des}$. Otherwise, if the velocity is not constrained, the velocity instruction $\dot{X}_{cmd}$ will be equal to the desired velocity $\dot{X}_{des}$.

Furthermore, by integrating the velocity, the desired position generated in the corresponding control cycle may be obtained as an equation of:

$$X_{des}^n = X_{cmd}^{n-1} + \frac{T_s}{2}\left(\hat{\dot{X}}_{cmd}^n + \dot{X}_{cmd}^{n-1}\right);$$

where, $X_{des}$ represents the desired position, and $X_{cmd}$ represents the position instruction.

In this embodiment, in the above-mentioned step S230, the acceleration instruction and/or the velocity instruction may be constrained according to different actual needs. The following are examples of constraining acceleration only, constraining acceleration and velocity simultaneously, and constraining velocity only.

Figure 4:
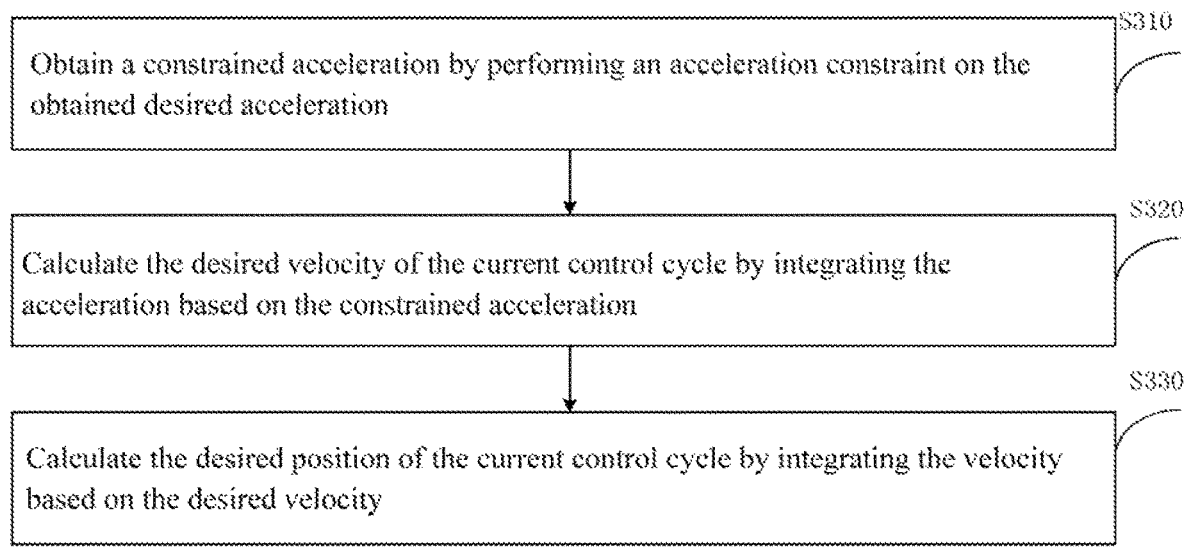
FIG. 4 is a flow chart of constraining acceleration in the robot admittance control method of FIG. 2.

FIG. 4 is a flow chart of constraining acceleration in the robot admittance control method of FIG. 2. As shown in FIG. 4, in the first example, step S230 may include the following sub-steps.

S310: obtaining a constrained acceleration by performing an acceleration constraint on the obtained desired acceleration.

S320: calculating the desired velocity of the current control cycle by integrating the acceleration based on the constrained acceleration.

S330: calculating the desired position of the current control cycle by integrating the velocity based on the desired velocity.

In this embodiment, after the desired acceleration is calculated, the desired acceleration may be constrained to meet constraints as equations of:

$$\ddot{X}_{des}^{(n)} = \alpha^{(n)} \ddot{X}_{des}^{(n)}; \text{ and}$$

$$\alpha^{(n)} = \min\left(1, \frac{\ddot{X}_{max}}{\|\ddot{X}_{des}^{(n)}\|}\right);$$

where, n represents the n-th control cycle, α is a corresponding acceleration constraint coefficient which may be realized by a limiter in a discrete system and is related to the desired acceleration of the current control cycle, and $\ddot{X}_{max}$ represents the maximum acceleration that the admittance controller can produce.

Figure 5:
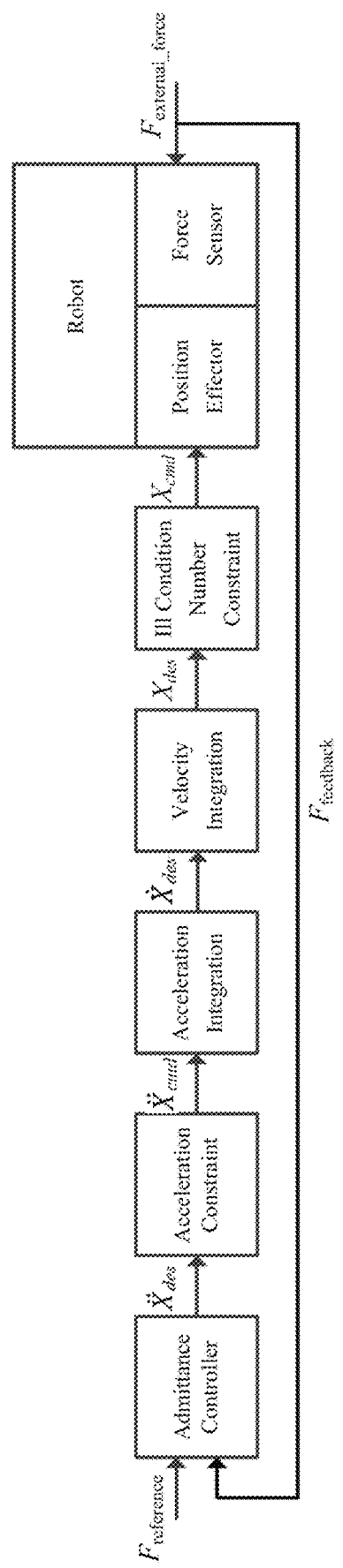
FIG. 5 is a schematic diagram of an application of constraining acceleration according to an embodiment of the present disclosure.

FIG. 5 is a schematic diagram of an application of constraining acceleration according to an embodiment of the present disclosure. As shown in FIG. 5, the eventual acceleration instruction $\ddot{X}_{cmd}$ may be obtained through the above-mentioned equations so as to obtain the desired velocity $\dot{X}_{des}$ by substituting the acceleration instruction $\ddot{X}_{cmd}$ into the equation for solving velocity. Since there is no constraint to velocity in this case, the desired velocity $\dot{X}_{des}$ is used as the velocity instruction to obtain the desired position $X_{des}$ of the current control cycle by substituting the desired velocity $\dot{X}_{des}$ into the equation for solving position, and then step S240 is executed.

By adding acceleration constraint in the admittance control, the torque limit of the robot's own hardware is taken into account. In this manner, it can avoid the acceleration impossible to be realized by the robot due to the torque limit in the admittance control that is caused by excessive external forces, and can also meet some occasions where it is necessary to limit the acceleration and other motion states of the robot.

Figure 6:
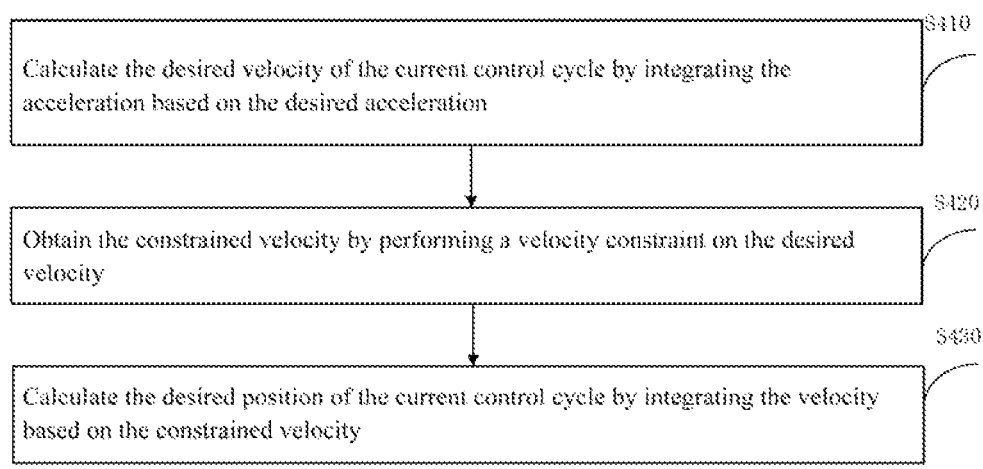
FIG. 6 is a flow chart of constraining velocity in the robot admittance control method of FIG. 2.

FIG. 6 is a flow chart of constraining velocity in the robot admittance control method of FIG. 2. As shown in FIG. 6, in the second example, step S230 may include the following sub-steps.

S410: calculating the desired velocity of the current control cycle by integrating the acceleration based on the desired acceleration.

S420: obtaining the constrained velocity by performing a velocity constraint on the desired velocity.

S430: calculating the desired position of the current control cycle by integrating the velocity based on the constrained velocity.

In this embodiment, the desired velocity may be constrained to meet constraints as equations of:

$$\dot{X}_{cmd}^n = \upsilon^{(n)} \dot{X}_{des}^{(n)}; \text{ and}$$

$$\upsilon^{(n)} = \min\left(1, \frac{\dot{X}_{max}}{\|\dot{X}_{des}^{(n)}\|}\right);$$

where, n represents the n-th control cycle, υ is a corresponding velocity constraint coefficient which may also be realized by the limiter in the discrete system and is related to the desired velocity of the current control cycle, and $\dot{X}_{max}$ represents the maximum velocity that the admittance controller can produce.

Figure 7:
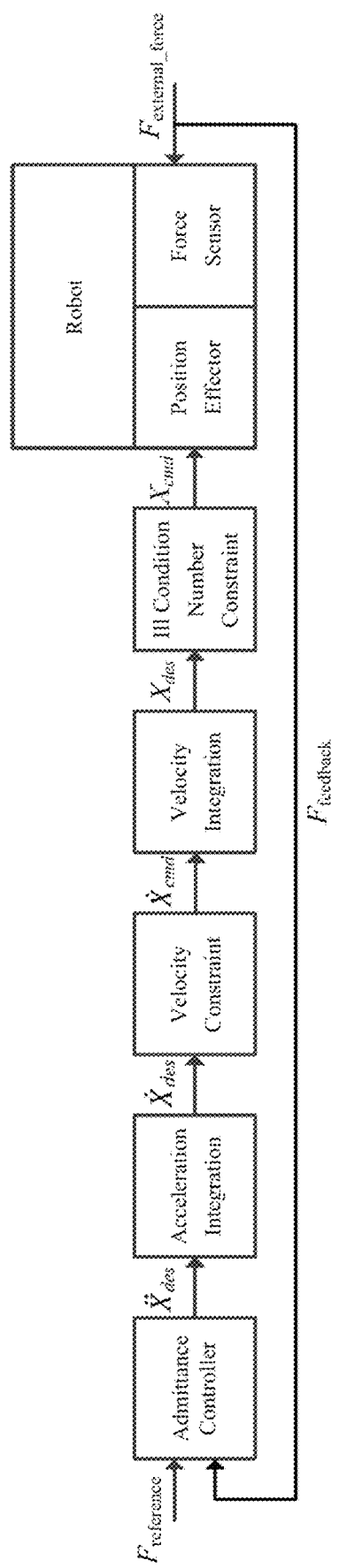
FIG. 7 is a schematic diagram of an application of constraining velocity according to an embodiment of the present disclosure.

FIG. 7 is a schematic diagram of an application of constraining velocity according to an embodiment of the present disclosure. As shown in FIG. 7, since the acceleration is not constrained, the desired velocity $\dot{X}_{des}$ is obtained by taking the desired acceleration $\ddot{X}_{des}$ as the acceleration instruction to substitute into the equation for solving velocity. Furthermore, the eventual velocity instruction $\dot{X}_{cmd}$ is obtained by constraining the desired velocity using the above-mentioned constraint equation. Finally, the desired position $X_{des}$ of the current control period is obtained by substituting the velocity instruction $\dot{X}_{cmd}$ into the equation for solving position, and then step S240 is executed.

By adding velocity constraint in the admittance control, the velocity limit of the robot's own hardware is taken into account. In this manner, it can avoid the velocity impossible to be realized by the robot due to the joint velocity limit in the admittance control that is caused by excessive external forces, and can also meet some occasions where it is necessary to limit the velocity and other motion states of the robot.

In other embodiments, for the case that there is no need to impose any constrains on the acceleration but only the velocity, the above-mentioned first admittance controller transfer function may also be directly converted into a third admittance controller transfer function between force and velocity by, for example, constructing a transfer function at the velocity level through first differentiation. At this time, the desired velocity of the robot in the current control cycle may be calculated based on the third admittance controller transfer function so as to constrain the desired velocity. Furthermore, the desired position may be calculated by integrating the velocity based on the constrained velocity.

Figure 8:
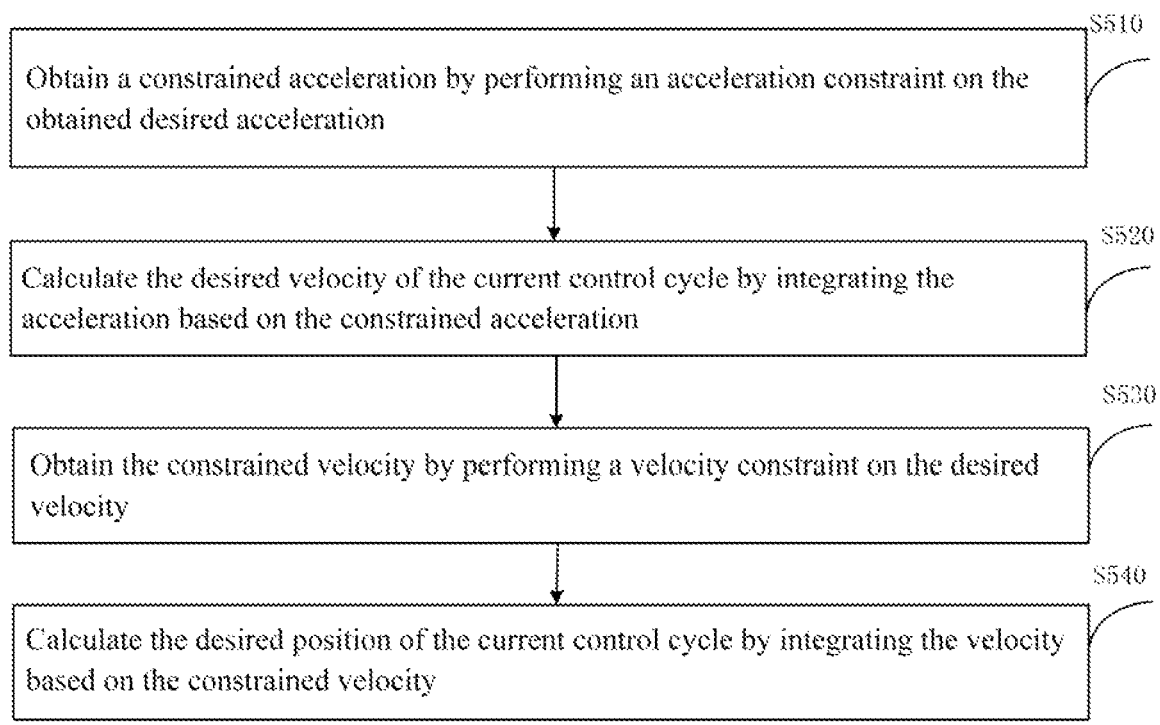
FIG. 8 is a flow chart of constraining acceleration and velocity in the robot admittance control method of FIG. 2.

FIG. 8 is a flow chart of constraining acceleration and velocity in the robot admittance control method of FIG. 2. As shown in FIG. 8, in the third example, step S230 may include the following sub-steps.

S510: obtaining a constrained acceleration by performing an acceleration constraint on the obtained desired acceleration.

S520: calculating the desired velocity of the current control cycle by integrating the acceleration based on the constrained acceleration.

S530: obtaining the constrained velocity by performing a velocity constraint on the desired velocity.

S540: calculating the desired position of the current control cycle by integrating the velocity based on the constrained velocity.

Figure 9:
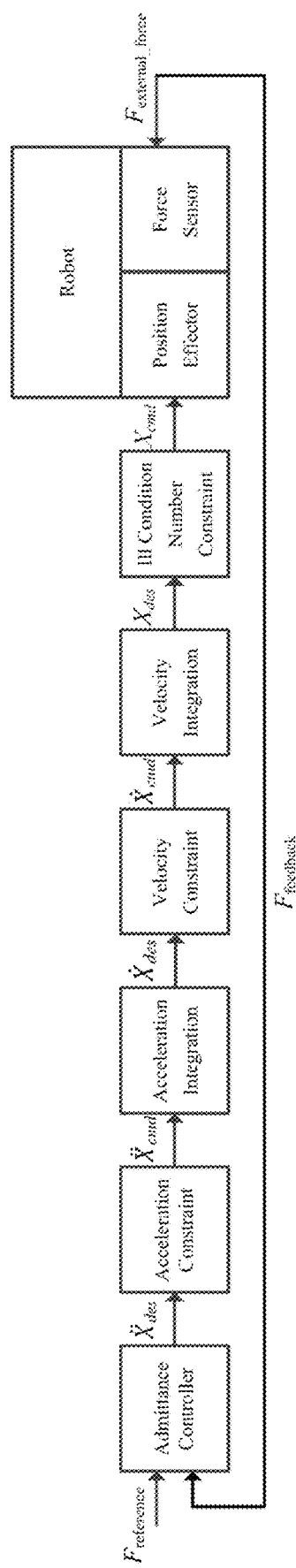
FIG. 9 is a schematic diagram of an application of constraining acceleration and velocity according to an embodiment of the present disclosure.

FIG. 9 is a schematic diagram of an application of constraining acceleration and velocity according to an embodiment of the present disclosure. As shown in FIG. 9, in this case, the acceleration and the velocity will be constrained at the same time. For example, the desired acceleration $\ddot{X}_{des}$ may be constrained using the above-mentioned equation for constraining the acceleration, and the desired velocity $\dot{X}_{des}$ may be constrained using the above-mentioned equation for constraining the velocity, and eventually the desired position $X_{des}$ of the current control cycle may be calculated using the constrained velocity, and the step S240 is executed.

S240: determining a corresponding Jacobian matrix according to a configuration of the robot in the current control cycle, and calculating an ill condition number of the Jacobian matrix.

S250: controlling the robot to move by inputting the obtained desired position in the current control cycle to a corresponding joint of the robot, in response to the ill condition number being less than a preset maximum ill condition number.

In which, for steps S240 and S250, please refer to steps S120 and S130 in the above-mentioned embodiment 1, respectively. The options regarding the above-mentioned embodiment 1 are also applicable to this embodiment, which will not be described herein.

It can be understood that by constraining the acceleration output instruction and the velocity output instruction during constraining the admittance control, the executability and safety of the robot can be further ensured. In addition, by constraining the position instruction output by the admittance control through the ill condition number, the robot can avoid the unreachability of the position instruction due to excessive external force or the singular configuration of the robot.

In this embodiment, the robot admittance control method also constrains the acceleration and/or the velocity during the admittance control in the admittance controller with position constraints based on the ill condition number. In this manner, under the condition of considering the physical limitations (e.g., the joint torque limit, and joint velocity limit) and the current status of the robot, the singularities caused by the admittance controller exceeding the work space can be avoided while the velocity reachability and force reachability of the robot can be ensured, and the acceleration, velocity, and the position trajectories that are generated by the admittance controller can be limited within a reasonable rang so as to meet the needs of more occasions.

Embodiment 3

Figure 10:
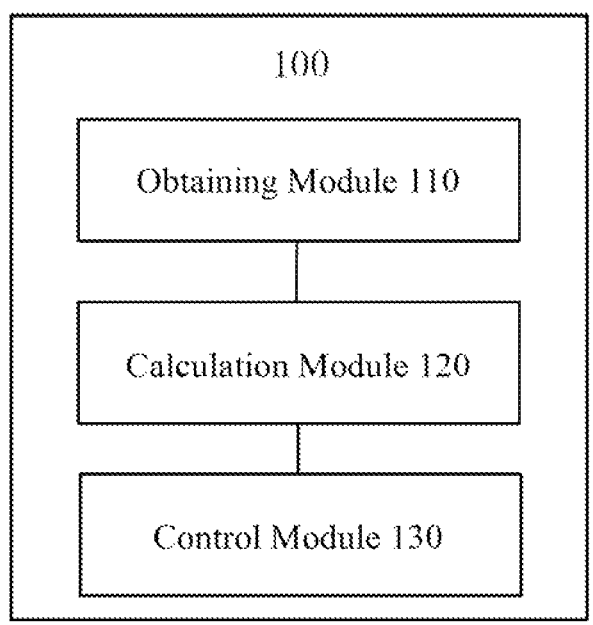
FIG. 10 is a schematic block diagram of the structure of a robot admittance control system according to an embodiment of the present disclosure.

FIG. 10 is a schematic block diagram of the structure of a robot admittance control system according to an embodiment of the present disclosure. As shown in FIG. 10, in this embodiment, an admittance control system 100 for the robot is provided based on the method of the above-mentioned embodiment 1. The admittance control system 100 may include:

an obtaining module 110 configured to obtain, based on a first admittance controller transfer function between force and position, a desired position of the robot in a current control cycle;

a calculation module 120 configured to determine a corresponding Jacobian matrix according to a configuration of the robot in the current control cycle, and calculating an ill condition number of the Jacobian matrix; and a control module 130 configured to control the robot to move by inputting the obtained desired position in the current control cycle to a corresponding joint of the robot, in response to the ill condition number being less than a preset maximum ill condition number.

Furthermore, the control module 130 may further be configured to control the robot to move by inputting a desired position of a previous control cycle to the corresponding joint of the robot, in response to the ill condition number being larger than or equal to the preset maximum ill condition number.

In which, the above-mentioned obtaining module 110 may calculate, based on the first admittance controller transfer function, the desired position of the robot in the current control cycle in a direct manner, or calculate the desired position in an indirect manner. The indirect calculation will be explained below with reference to specific implementations.

In some embodiments, the robot admittance control system may further include a function processing module configured to convert the first admittance controller transfer function between force and position into a second admittance controller transfer function between force and acceleration. Furthermore, the obtaining module 110 may be configured to obtain the desired position of the robot in the current control cycle.

Figure 11:
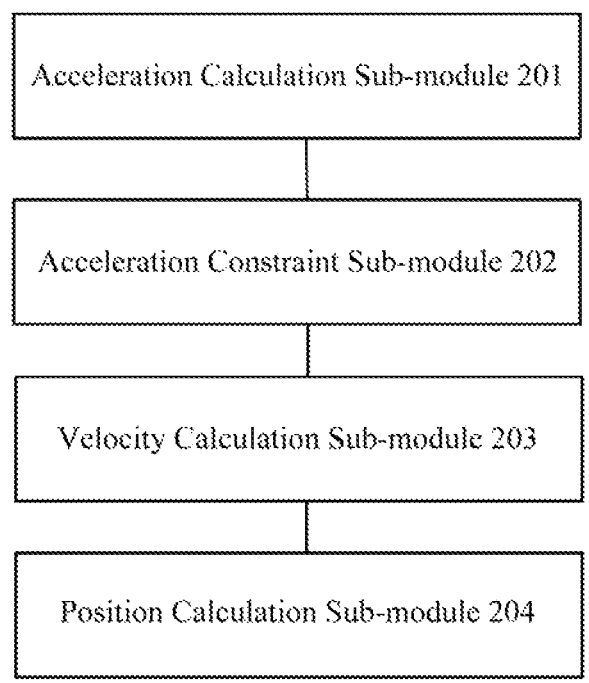
FIG. 11 is a schematic block diagram of the first structure of an obtaining module of the robot admittance control system of FIG. 10.

FIG. 11 is a schematic block diagram of the first structure of an obtaining module of the robot admittance control system of FIG. 10. As shown in FIG. 11, in the first structure, the obtaining module 110 may include an acceleration calculation sub-module 201, an acceleration constraint sub-module 202, a velocity calculation sub-module 203, and a position calculation sub-module 204. In which, the acceleration calculation sub-module 201 is configured to calculate, based on the second admittance controller transfer function, a desired acceleration of the robot in the current control cycle. The acceleration constraint submodule 202 is configured to obtain a constrained acceleration by performing an acceleration constraint on the obtained desired acceleration. The velocity calculation sub-module 203 is configured to calculate the desired velocity of the current control cycle by integrating the acceleration based on the constrained acceleration. The position calculation sub-module 204 is configured to calculate the desired position of the current control cycle by integrating the velocity based on the desired velocity.

Figure 12:
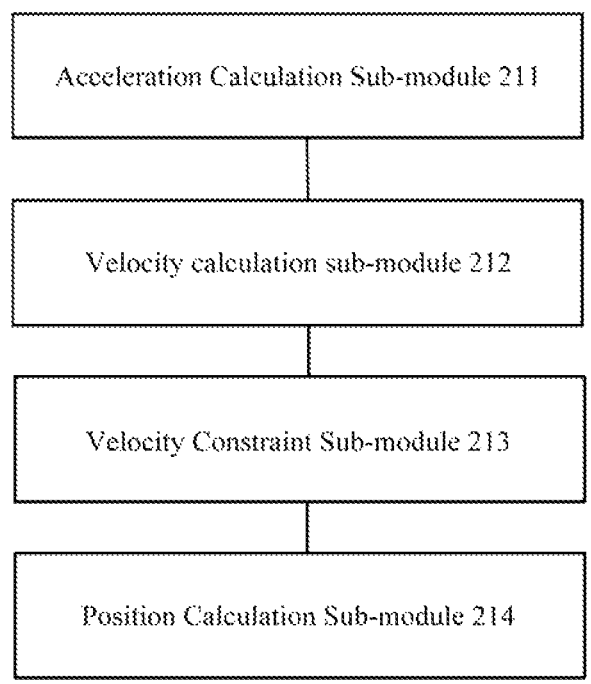
FIG. 12 is a schematic block diagram of the second structure of an obtaining module of the robot admittance control system of FIG. 10.

FIG. 12 is a schematic block diagram of the second structure of an obtaining module of the robot admittance control system of FIG. 10. As shown in FIG. 12, in the second structure, the obtaining module 110 may include an acceleration calculation sub-module 211, a velocity calculation sub-module 212, a velocity constraint sub-module 213 and a position calculation sub-module 214. In which, the acceleration calculation sub-module 211 may be configured to calculate, based on the second admittance controller transfer function, a desired acceleration of the robot in the current control cycle. The velocity calculation sub-module 212 may be configured to calculate the desired velocity of the current control cycle by integrating the acceleration based on the desired acceleration. The velocity constraint sub-module 213 may be configured to obtain the constrained velocity by performing a velocity constraint on the desired velocity. The position calculation sub-module 214 may be configured to calculate the desired position of the current control cycle by integrating the velocity based on the constrained velocity.

For the case that the acceleration is not constrained but the velocity is constrained, as an alternative example, the function processing module may convert the first admittance controller transfer function into a third admittance controller transfer function between force and velocity. Furthermore, the obtaining module 110 may be configured to calculate, based on the third admittance controller transfer function, a desired velocity of the robot in the current control cycle to constrain the desired velocity, and calculating the desired position of the current control cycle by integrating the velocity based on the constrained velocity.

Figure 13:
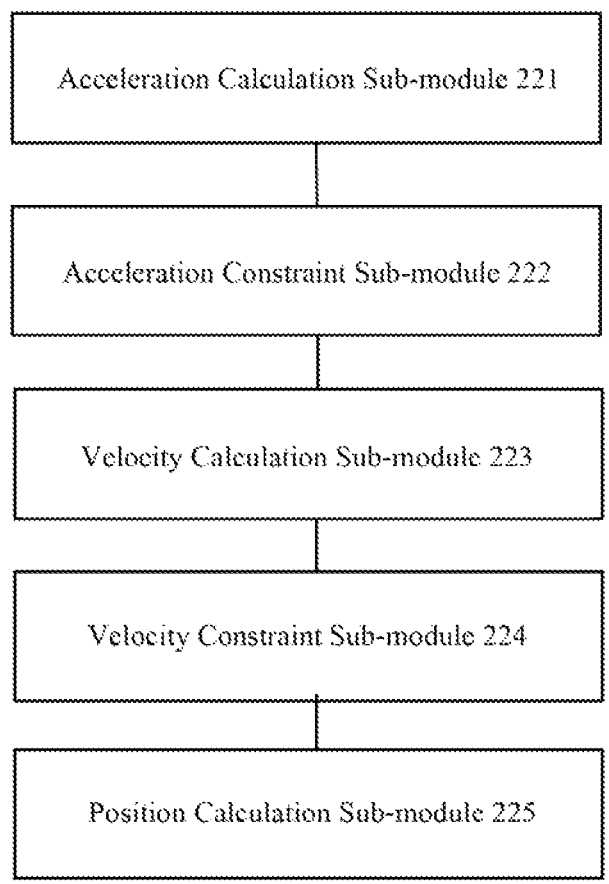
FIG. 13 is a schematic block diagram of the third structure of an obtaining module of the robot admittance control system of FIG. 10.

FIG. 13 is a schematic block diagram of the third structure of an obtaining module of the robot admittance control system of FIG. 10. As shown in FIG. 13, in the third structure, the obtaining module 110 may include an acceleration calculation sub-module 221, an acceleration constraint sub-module 222, a velocity calculation sub-module 223, a velocity constraint sub-module 224 and a position calculation sub-module 225. In which, the acceleration calculation sub-module 221 may be configured to calculate, based on the second admittance controller transfer function, a desired acceleration of the robot in the current control cycle. The acceleration constraint submodule 222 may be configured to obtain a constrained acceleration by performing an acceleration constraint on the obtained desired acceleration. The velocity calculation sub-module 223 may be configured to calculate the desired velocity of the current control cycle by integrating the acceleration based on the constrained acceleration. The velocity constraint submodule 224 may be configured to obtain the constrained velocity by performing a velocity constraint on the desired velocity. The position calculation sub-module 225 may be configured to calculate the desired position of the current control cycle by integrating the velocity based on the constrained velocity.

It can be understood that the system of this embodiment corresponds to the method of the above-mentioned embodiment 1, and the options in the above-mentioned embodiment 1 are also applicable to this embodiment, which will not be repeated herein.

The present disclosure also provides a robot such as a humanoid robot. In one embodiment, the robot may include a processor and a storage (e.g., a memory). In which, the storage stores a computer program, and the processor executes the computer program to cause the robot to execute the above-mentioned robot admittance control method or functions of each module of the above-mentioned robot admittance control system.

The present disclosure also provides a non-transitory computer-readable storage medium for storing the computer program used in the above-mentioned robot.

In the embodiments of the present disclosure, it should be understood that the disclosed method and apparatus may be implemented in other manners. The above-mentioned apparatus embodiment is merely illustrative, for example, the flow charts and structural diagrams in the drawings show the architecture, functions and operations that are possible to be implemented by the apparatus, method and computer program products of the embodiments. In this regard, each block in the flowchart or block diagram may represent a module, a program segment, or a part of codes that include one or more computer executable instructions for implementing specified logical functions. It should also be noted that, in alternative implementations, the functions noted in the blocks may occur out of the order noted in the figures. For example, two blocks in succession may, in fact, be executed substantially concurrently, or may sometimes be executed in the reverse order, depending upon the functionality involved. It is also to be noted that each block in the block diagrams and/or flow charts, and the combination of blocks in the block diagrams and/or flow charts, may be implemented by a dedicated hardware-based system for performing the specified function or action, or may be implemented by a combination of special purpose hardware and computer instructions.

In addition, each functional module or unit in each embodiment of the present disclosure may be integrated to form an independent part, each module or unit may exist independently, or two or more modules or units may be integrated to form an independent part.

The functions can be stored in a computer-readable storage medium if it is implemented in the form of a software functional unit and sold or utilized as a separate product. Based on this understanding, the technical solution of the present disclosure, either essentially or in part, contributes to the prior art, or a part of the technical solution can be embodied in the form of a software product. The software product is stored in a storage medium, which includes a number of instructions for enabling a computer device (which can be a smart phone, a personal computer, a server, a network device, etc.) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The forgoing is only the specific embodiment of the present disclosure, while the scope of the present disclosure is not limited thereto. For those skilled in the art, modifi-

What is claimed is:

1. A computer-implemented admittance control method for a robot, comprising:
obtaining, based on a first admittance controller transfer function between force and position, a desired position of the robot in a current control cycle;
determining a corresponding Jacobian matrix according to a configuration of the robot in the current control cycle, and calculating an ill condition number of the Jacobian matrix; and
controlling the robot to move by inputting the obtained desired position in the current control cycle to a corresponding joint of the robot, in response to the ill condition number being less than a preset maximum ill condition number.

2. The method of claim 1, further comprising:
controlling the robot to move by inputting a desired position of a previous control cycle to the corresponding joint of the robot, in response to the ill condition number being larger than or equal to the preset maximum ill condition number.

3. The method of claim 1, wherein obtaining the desired position of the robot in the current control cycle includes:
calculating, based on the first admittance controller transfer function, the desired position of the robot in the current control cycle.

4. The method of claim 1, wherein before obtaining the desired position of the robot in the current control cycle, further comprising:
converting the first admittance controller transfer function into a second admittance controller transfer function between force and acceleration;
obtaining the desired position of the robot in the current control cycle includes:
calculating, based on the second admittance controller transfer function, a desired acceleration of the robot in the current control cycle, and calculating, based on the desired acceleration, the desired position of the current control cycle by integrating an acceleration and integrating a velocity, wherein at least one of the desired acceleration and a calculated desired velocity of the robot are constrained, where the desired acceleration is constrained before the acceleration is integrated, and the calculated desired velocity is constrained before the velocity is integrated.

5. The method of claim 4, wherein the desired acceleration satisfies constraints as equations of:

$$\ddot{X}_{cmd}^{(n)} = \alpha^{(n)} \ddot{X}_{des}^{(n)}; \text{ and}$$

$$\alpha^{(n)} = \min\left(1, \frac{\ddot{X}_{max}}{\|\ddot{X}_{des}^{(n)}\|}\right);$$

where, $\alpha^{(n)}$ represents an acceleration constraint coefficient of the n-th control cycle, and $\ddot{X}_{max}$ represents a maximum acceleration can be produced by an admittance controller corresponding to the first admittance controller transfer function.

6. The method of claim 4, wherein the desired velocity satisfies constraints as equations of:

$$\dot{X}_{cmd}^{(n)} = \upsilon^{(n)} \dot{X}_{des}^{(n)}; \text{ and}$$

$$\upsilon^{(n)} = \min\left(1, \frac{\dot{X}_{max}}{\|\dot{X}_{des}^{(n)}\|}\right);$$

where, $\upsilon^{(n)}$ represents a velocity constraint coefficient of the n-th control cycle, and $\dot{X}_{max}$ represents a maximum velocity can be produced by an admittance controller corresponding to the first admittance controller transfer function.

7. The method of claim 1, wherein before obtaining the desired position of the robot in the current control cycle, further comprising:
converting the first admittance controller transfer function into a third admittance controller transfer function between force and velocity;
obtaining the desired position of the robot in the current control cycle includes:
calculating, based on the third admittance controller transfer function, a desired velocity of the robot in the current control cycle to constrain the desired velocity, and calculating the desired position of the current control cycle by integrating the velocity based on the constrained velocity.

8. The method of claim 1, wherein the ill condition number of the Jacobian matrix is calculated using an equation of:

$$cond(J) = \frac{\|J\|_2}{\|J^{-1}\|_2};$$

where, cond represents the ill condition number, J is the Jacobian matrix of the current control cycle; and $\|J\|_2$ is the second norm of the Jacobian matrix J, and $\|J^{-1}\|_2$ is the second norm of the inverse matrix $J^{-1}$ of the Jacobian matrix J.

9. The method of claim 1, wherein the first admittance controller transfer function between force and position is constructed based on a mass spring damping model.

10. A robot, comprising:
a processor;
a memory coupled to the processor; and
one or more computer programs stored in the memory and executable on the processor;
wherein, the one or more computer programs comprise:
instructions for obtaining, based on a first admittance controller transfer function between force and position, a desired position of the robot in a current control cycle;
instructions for determining a corresponding Jacobian matrix according to a configuration of the robot in the current control cycle, and calculating an ill condition number of the Jacobian matrix; and
instructions for controlling the robot to move by inputting the obtained desired position in the current control cycle to a corresponding joint of the robot, in response to the ill condition number being less than a preset maximum ill condition number.

11. The robot of claim 10, wherein the one or more computer programs further comprise:
instructions for controlling the robot to move by inputting a desired position of a previous control cycle to the corresponding joint of the robot, in response to the ill condition number being larger than or equal to the preset maximum ill condition number.

12. The robot of claim 10, wherein the instructions for obtaining the desired position of the robot in the current control cycle include:
instructions for calculating, based on the first admittance controller transfer function, the desired position of the robot in the current control cycle.

13. The robot of claim 10, wherein the one or more computer programs further comprise:
instructions for converting the first admittance controller transfer function into a second admittance controller transfer function between force and acceleration;
the instructions for obtaining the desired position of the robot in the current control cycle include:
instructions for calculating, based on the second admittance controller transfer function, a desired acceleration of the robot in the current control cycle, and calculating, based on the desired acceleration, the desired position of the current control cycle by integrating an acceleration and integrating a velocity, wherein at least one of the desired acceleration and a calculated desired velocity of the robot are constrained, where the desired acceleration is constrained before the acceleration is integrated, and the calculated desired velocity is constrained before the velocity is integrated.

14. The robot of claim 13, wherein the desired acceleration satisfies constraints as equations of:

$$\ddot{X}_{cmd}^{(n)} = \alpha^{(n)} \ddot{X}_{des}^{(n)}; \text{ and}$$

$$\alpha^{(n)} = \min\left(1, \frac{\ddot{X}_{max}}{\|\ddot{X}_{des}^{(n)}\|}\right);$$

where, $\alpha^{(n)}$ represents an acceleration constraint coefficient of the n-th control cycle, and $\ddot{X}_{max}$ represents a maximum acceleration can be produced by an admittance controller corresponding to the first admittance controller transfer function.

15. The robot of claim 13, wherein the desired velocity satisfies constraints as equations of:

$$\dot{X}_{cmd}^{n} = \upsilon^{(n)} \dot{X}_{des}^{(n)}; \text{ and}$$

$$\upsilon^{(n)} = \min\left(1, \frac{\dot{X}_{max}}{\|\dot{X}_{des}^{(n)}\|}\right);$$

where, $\upsilon^{(n)}$ represents a velocity constraint coefficient of the n-th control cycle, and $\dot{X}_{max}$ represents a maximum velocity can be produced by an admittance controller corresponding to the first admittance controller transfer function.

16. The robot of claim 10, wherein the one or more computer programs further comprise:
instructions for converting the first admittance controller transfer function into a third admittance controller transfer function between force and velocity;
the instructions for obtaining the desired position of the robot in the current control cycle include:
instructions for calculating, based on the third admittance controller transfer function, a desired velocity of the robot in the current control cycle to constrain the desired velocity, and calculating the desired position of the current control cycle by integrating the velocity based on the constrained velocity.

17. The robot of claim 10, wherein the ill condition number of the Jacobian matrix is calculated using an equation of:

$$cond(J) = \frac{\|J\|_2}{\|J^{-1}\|_2};$$

where, cond represents the ill condition number, J is the Jacobian matrix of the current control cycle; and $\|J\|_2$ is the second norm of the Jacobian matrix J, and $\|J^{-1}\|_2$ is the second norm of the inverse matrix $J^{-1}$ of the Jacobian matrix J.

18. The robot of claim 10, wherein the first admittance controller transfer function between force and position is constructed based on a mass spring damping model.

19. A non-transitory computer-readable storage medium for storing one or more computer programs, wherein the one or more computer programs comprise:
instructions for obtaining, based on a first admittance controller transfer function between force and position, a desired position of the robot in a current control cycle;
instructions for determining a corresponding Jacobian matrix according to a configuration of the robot in the current control cycle, and calculating an ill condition number of the Jacobian matrix; and
instructions for controlling the robot to move by inputting the obtained desired position in the current control cycle to a corresponding joint of the robot, in response to the ill condition number being less than a preset maximum ill condition number.

20. The storage medium of claim 19, wherein the one or more computer programs further comprise:
instructions for controlling the robot to move by inputting a desired position of a previous control cycle to the corresponding joint of the robot, in response to the ill condition number being larger than or equal to the preset maximum ill condition number.

* * * * *